3,556,946
MALTING PROCESS
Percy B. Polen, Skokie, Ill., assignor to Velsicol Chemical Corporation, Chicago, Ill., a corporation of Illinois
No Drawing. Filed June 23, 1967, Ser. No. 648,200
Int. Cl. C12c 1/04
U.S. Cl. 195—71         9 Claims

ABSTRACT OF THE DISCLOSURE

A process for controlling the growth of rootlets during the germination of grain in the malting process consisting of treating the grain with a compound selected from the group consisting of 3,6-dichloro-o-anisic acid, its ammonium salt, its alkali metal salts and its amine salts, wherein the amine component is selected from the group consisting of mono-, di- and tri-lower alkyl and mono-, di- and tri-lower alkanol in a quantity sufficient to control the rootlet growth.

---

Malt, a processed grain, is widely used in the manufacture of fermented alcoholic beverages for which it supplies fermentable sugars, flavoring, certain enzymes and other important ingredients. The art of malting grain is an ancient art which has been practiced through the centuries and dates back as far as the early Egyptians. Malting essentially consists of allowing such grains as wheat, rye or barley to partially germinate under controlled conditions whereby certain chemical and physiological changes take place. The malting process may be divided into three main steps, steeping, germination and kilning. Steeping consists of soaking the grain in water having a temperature of from about 50 to about 65° F. until the grains have absorbed enough moisture to start germination. The steeped grain is then transferred into compartments where enough water is added to bring the moisture content up to about 45 to about 50% and where under controlled temperature and moisture conditions germination takes place. After the desired amount of germination has taken place, during which time the grain has developed rootlets and coleoptile, and produced such starch-splitting enzymes as $\alpha$- and $\beta$-amylase, the grain is dried with hot air in the kilning step. The kilning terminates any further germination and imparts the aroma and flavor giving properties to the grain. The rootlets are removed from the grain after the kilning process.

The enzymes, $\alpha$- and $\beta$-amylase which are produced during germination diffuse into the starch of the grain and convert part of this starch into dextrins and fermentable sugars. The rootlets grow at the expense of these sugars and since the rootlets are removed at the end of the malting process these rootlets represent a loss in weight of the malt. Roots usually comprise about 3½ percent by weight of the malt. Thus it can be seen that if the rootlet growth during the malting proces could be controlled, an increase in the malt yield would result and a considerable saving could be realized.

Additives such as gibberellic acid or its salts are used in the malting industry. Gibberellic acid increases the $\alpha$- and $\beta$-amylase production in malt during germination, resulting in a higher starch conversion into fermentable sugars. While this is very desirable it also results in an increased respiration, increased cold water extract and an increased rootlet growth all of which represents a loss in the malt yield. Thus a need exists for a counteractant to the undesirable side effects of gibberellins.

It has now been found that 3,6-dichloro-o-anisic acid and its water soluble salts selected from the group consisting of the ammonium salt, the alkali metal salts and the amine salt, wherein the amine component is selected from the group consisting of mono-, di- and tri-lower alkyl amines and mono-, di and tri-lower alkanolamines, are unusually active in controlling rootlet growth during the germination of grain in the malting process without undesirable side effects in the finished malt.

It has further been found that 3,6-dichloro-o-anisic acid and its water-soluble salts offset the undesirable side effects such as excess rootlet growth, increased respiration and increased cold water extract caused by such germination stimulants as the gibberellins.

The use of the water soluble salts of 3,6-dichloro-o-anisic acid, heretofore mentioned is preferred. Exemplary of the suitable salts are ammonium 3,6-dichloro-o-anisate, sodium 3,6-dichloro-o-anisate, potassium 3,6-dichloro-o-anisate, dimethylamine salt of 3,6-dichloro-o-anisic acid, triethylamine salt of 3,6-dichloro-o-anisic acid, diethyl amine salt of 3,6-dichloro-o-anisic acid, diethanolamine salt of 3,6-dichloro-o-anisic acid, triethanolamine salt of 3,6-dichloro-o-anisic acid, the isopropylamine salt of 3,6-dichloro-o-anisic acid and the like. These salts can be readily obtained as described in U.S. Pat. No. 3,013,054.

For use as rootlet growth controllants in the malting process the heretofore mentioned compounds are preferably used as aqueous solutions. Aqueous solutions can be readily prepared by dissolving the compound in water.

The process of the present invention for controlling rootlet growth during the malting of grain comprises treating the grain with an aqueous solution of a heretofore mentioned salt of 3,6-dichloro-o-anisic acid in such quantities as is necessary to effectively retard the growth of rootlets. This process can be readily carried out by adding any of the heretofore mentioned water-soluble salts to the water used in the malting of grain at a concentration of about 0.1 to about 20 p.p.m. based on the weight of the grain. In a preferred process the grain is treated at the beginning of the germination step by incorporating about 1 to about 10 p.p.m. of the active salt, based on the weight of the grain, into the water which is added to the grain at this time.

The process of treating malt with 3,6-dichloro-o-anisic acid or its water-soluble salt in conjunction with gibberellic acid or its water-soluble salt is readily carried out by incorporating the compound into the water used in the malting of grain. In a preferred process about 0.1 to about 20 p.p.m. of a water-soluble salt of 3,6-dichloro-o-anisic acid, based on grain weight, and about 0.05 to about 5.0 p.p.m. of a water-soluble salt of gibberellic acid, based on grain weight, are dissolved into the water with which the grain is treated at the beginning of the germination step of the malting process.

In order to demonstrate the effectiveness of the compounds disclosed in this invention for the use of rootlet growth controllants in the malting process, two batches of barley were malted. One batch was treated with the sodium salt of 3,6-dichloro-o-anisic acid at a level of 4 parts of said salt per 1,000,000 parts of barley by incorporating said salt into the water with which the barley was treated during early germination. The other batch underwent a normal malting process for the purpose of a control. After malting was completed the weight percent of rootlets baesd on total malt weight was determined. The results were as follows:

TABLE I

|  | Weight percent of rootlets |
|---|---|
| Malt treated with sodium 3,6-dichloro-o-anisate | 1.0 |
| Untreated malt | 3.5 |

Malt analyses, conducted as prescribed by the American Society of Brewing Chemists, were performed on both a malt treated with a novel rootlet growth retardant of this invention and on an untreated malt used as a control. The properties of the treated malt were similar to those of the untreated malt, indicating the absence of undesirable side effects resulting from the use of a growth retardant of this invention. The data is shown in the following table:

TABLE II

|  | Treated malt [1] | Untreated malt |
|---|---|---|
| Assortment (percent): |  |  |
| 7/64 in | 46.5 | 35.9 |
| 9/64 in | 47.6 | 51.1 |
| 5/64 in | 5.4 | 12.6 |
| Thru | 0.5 | 0.4 |
| Protein content: |  |  |
| Total, dry (percent) | 12.95 | 12.80 |
| Soluble, dry (percent) | 5.15 | 4.74 |
| Soluble, total (percent) | 39.7 | 37.0 |
| Diastatic power (° L.) | 137 | 133 |
| Alfa-amylase | 40.4 | 39.9 |

[1] Treated with sodium 3,6-dichloro-o-anisate.

The brewhouse performance of the treated malt versus the untreated malt was determined by making two pilot brews of each of the above malts to further insure that the malts treated according to this invention are suitable for brewing. The properties of the treated malt are similar to those of the untreated malt implying comparable performance for the two malts. The results are shown in the following table:

TABLE III

|  | Treated malt [1] | | Untreated malt | |
|---|---|---|---|---|
|  | I | II | I | II |
| Conversion | Normal | Normal | Normal | Normal |
| "1st wort" (° P.) | 16.36 | 16.46 | 16.30 | 16.50 |
| "Last wort" (° P.) | 0.6 | 0.7 | 0.9 | 0.5 |
| Yield (malt, percent) | 74.1 | 73.9 | 73.9 | 74.2 |
| Efficiency (percent) | 97.7 | 97.3 | 96.8 | 97.2 |
| Protein (g./100 ml.) | 0.509 | 0.525 | 0.480 | 0.480 |
| Color (° Lov) | 2.6 | 2.6 | 2.8 | 2.8 |
| Runoff | Normal | Normal | Normal | Normal |

[1] Treated with sodium 3,6-dichloro-o-anisate.

I claim:

1. A process for controlling the growth of rootlets during the germination of grain in the malting process consisting of treating the grain with a compound selected from the group consisting of 3,6-dichloro-o-anisic acid, its ammonium salt, its alkali metal salts and its amine salts, wherein the amine component is selected from the group consisting of mono-, di- and tri-lower alkyl and mono-, di- and tri-lower alkanol in a quantity sufficient to control the rootlet growth.

2. The process of claim 1 wherein the quantity of the rootlet controlling compound is from about 0.1 to about 20 p.p.m. of the weight of the grain.

3. The process of claim 1 wherein the rootlet controlling compound is applied in the form of a water solution.

4. The process of claim 1 wherein the rootlet controlling compound is applied by dissolving it in the water in which the grain is treated during the germination of the grain.

5. The process of claim 1 wherein the rootlet controlling compound is sodium 3,6-dichloro-o-anisate.

6. The process of claim 1 wherein the rootlet controlling compound is potassium 3,6-dichloro-o-anisate.

7. The process of claim 1 wherein the rootlet controlling compound is ammonium 3,6-dichloro-o-anisate.

8. The process of claim 1 wherein the rootlet controlling compound is the dimethylamine of 3,6-dichloro-o-anisic acid.

9. The process of claim 1 wherein the rootlet controlling compound is the diethanolamine of 3,6-dichloro-o-anisic acid.

References Cited

UNITED STATES PATENTS 3,188,279   6/1965   Kneen et al. _____ 195—70

OTHER REFERENCES

Mitchell: Chemical Abstracts, vol. 61, Dec. 28, 1964, 15043d, "Absorption, Translocation, and Exudation of Biologically Active Compounds in Plants."

Friesen et al.: Chemical Abstracts, vol. 66, Jan. 10, 1967, 1785p, "The Influence of Temp. and Soil Moisture on the Phytotoxicity of Dicamba."

Allen: Chemical Abstracts, vol. 66, Feb. 20, 1967, 27,928H, "Tolerance of Barley to MCPA and Dicamba."

A. LOUIS MONACELL, Primary Examiner

GARY M. NATH, Assistant Examiner